United States Patent [19]

Soto et al.

[11] Patent Number: 4,958,964
[45] Date of Patent: Sep. 25, 1990

[54] SEMIRIGID FLOATING PAVEMENT

[76] Inventors: Javier B. Soto; Domingo F. Llamas, both of Calle Ramón Gordillo Nr. 5, 46010 Valencia, Spain

[21] Appl. No.: 231,876

[22] Filed: Aug. 12, 1988

[30] Foreign Application Priority Data

Aug. 13, 1987 [ES] Spain .................. 8702395

[51] Int. Cl.⁵ ............................... E01C 5/00
[52] U.S. Cl. ....................... 404/40; 52/606
[58] Field of Search ............ 404/34, 37, 38, 39, 404/40, 73, 76, 45, 46; 52/126.5, 743, 606

[56] References Cited

U.S. PATENT DOCUMENTS

| | | | |
|---|---|---|---|
| 483,105 | 9/1892 | De Fernelmont | 52/606 |
| 1,931,650 | 10/1933 | Elmendorf | 404/46 |
| 2,294,582 | 9/1942 | Sullivan | 404/45 |
| 4,568,584 | 2/1986 | Holland | 404/40 |

FOREIGN PATENT DOCUMENTS

| | | | |
|---|---|---|---|
| 2000966 | 7/1971 | Fed. Rep. of Germany | 52/126.5 |
| 448792 | 5/1949 | Italy | 52/606 |
| 983164 | 12/1982 | U.S.S.R. | 404/34 |

OTHER PUBLICATIONS

*Port Development International*, Jul./Aug. 1988.
*Port Development International*, Jul./Aug. 1989.
*Civil Engineering*, "Surface Impressions", Cargo Systems, Apr. 1989.

*Primary Examiner*—Stephen J. Novosad
*Assistant Examiner*—Gay Ann Spahn
*Attorney, Agent, or Firm*—Bernard, Rothwell & Brown

[57] ABSTRACT

A semirigid floating pavement formed out of masses of reinforced concrete molded pieces, disposed side by side to form as wide a surface as neeeded. Each piece has a regular polygon plane with a flat top surface and an inner recess connected with the surface by means of a perforation and opening at its base. This base has the surface inclined toward the geometric center. Pieces are bedded onto a layer of sand. The inner recess is occupied with a mass of sand injected through the perforation which connects with the upper part, which perforation is closed up with an elastic cap or stopper. A channel is disposed around each piece in which is housed a joint acting as union and support between adjacent pieces.

6 Claims, 3 Drawing Sheets

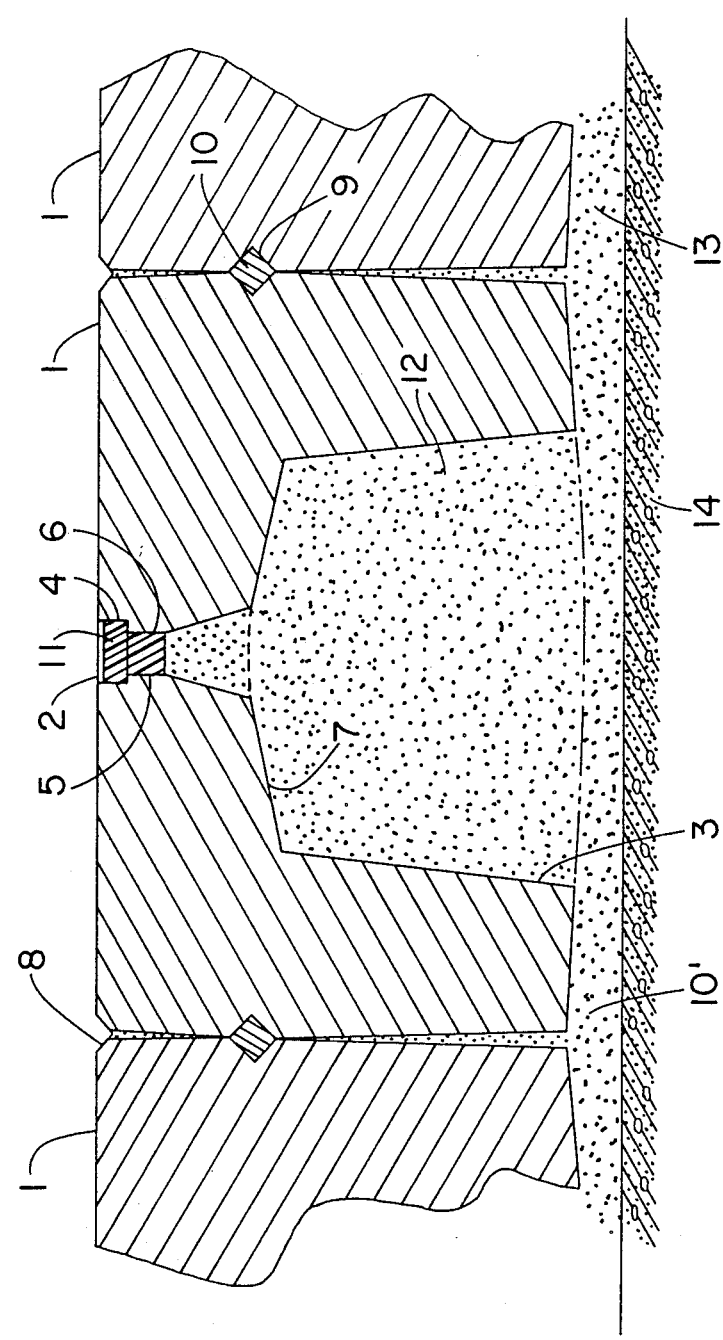

SEMIRIGID FLOATING PAVEMENT

BACKGROUND OF THE INVENTION

1. Field Of The Invention

The present invention relates to a semirigid floating pavement with special application for new road surfacing.

2. Background

Road pavement techniques have a broad bibliography and very complete and improved studies for dimensions of surfaces with generally known or supposed hypotheses of calculation, such as density of traffic, axle load and features of the floor onto which it is being constructed.

The same is not true with respect to paving large surfaces for handling and transport of merchandise, especially solid bulk and containers particularly when there are to be paved grounds near the seaside. We wish herein to treat road surfaces as zones pertaining to ports and generally directed to areas filled to capacity such as those that exist with ports in expansion which create serious problems in moving seaboard freight towards the interior of a country, so that new docks have to be created, as well as large surfaces for the storage and manipulation of goods and freight onto artificial fillings. For example, at this time in Japan artificial islands are put up in industrial and commercial areas.

To come closer to the subject and concentrate on the necessities of an ideal hypothetical surface, we shall analyze the effects actually produced on pavements near the ports.

The heavy machinery actually circulating in the ports can surpass even 80 Tm per axle. Such heavy machinery can be loading shovels or equipment for containers which produce braking and turning effects on the proper ground and can increase the pressure on the pavement, thereby degrading the contact surface.

On the other hand, the arbitrariness of movement on the pavement acts unfavorably and makes the effects mentioned above possible on any point. Perhaps the worst effects could be avoided by ordering operations within one zone, which may be possible in some cases, and there could be oversized roller track paths. Although it would always be a zone hypothecated for any other change of order or treatment, it could be introduced within a medium or long time.

Due to the previous circumstances, use of rigid or non-rigid pavement is projected with certain skepticism knowing that in the end rigid pavements crack and break as a consequence of ground deformation and non-rigid pavements get deformed under the effects of load and settling on the ground, degrading the surface under the effect of pneumatic friction and other metallic elements impacting against the surface which also produce breakage.

As a consequence of what we discussed above and as a lesser evil (as explained in the latest publications about this particular subject), the actual trend in the U.S. and the U.K. is to treat these sorts of surfaces with prefabricated elements, a kind of paving block or stone, disposed in very diverse ways, knowing that the deformations which unavoidably will be produced in the pavement have to be repaired by raising the affected area, filling up the produced concavity and repaving, since a deformed surface is a great danger for the stability of the machinery and wares stored in movements of a certain height.

Anyway and as a prudent step, any type of pavement has as a premise the wait of five to ten years (once the filling-up phase is finished) for its execution, basically depending from the height of the filling and the quality (some times very expensive) of the material used, all to accomplish compactness in the filling and to avoid disastrous effects in the pavement as a consequence of large settlements or slumps.

Accordingly, it seems logical to think that a pavement with the above-identified qualities would improve the final result. Therefore, a pavement capable of supporting the mentioned changes (the non-rigid one being unsuitable for this purpose) which is capable of being formed according to the support onto which it is located (for which the rigid one is unsuitable), and which is capable of recovering its initial state once deformed (for which purpose prefabricated stone is unsuitable) brings forth some appreciable advantages, for instance, not waiting such a long time for a pavement of filling, using lower quality products for filling, with the consequent economic savings which in some cases could suppose and create a multi-use area, and without special conditioning.

SUMMARY OF THE INVENTION

According to the invention there is provided a semi-rigid floating pavement formed by two prefabricated masses or armored concrete pieces of variable sizes, interconnected by means of a rubber joint in the way of a cube acting as support-union, also of different sizes.

The basic feature of the invention is that the prefabricated concrete piece disposes of an inner groove in the form of a truncated cone, connected with the upper face by an orifice and open at the lower base, making possible the injection of sand through the upper orifice into the inside of the piece and posteriorly compressing the same.

The sand acts as support of the proper piece.

In this way the exact load on the prefabricated piece will transmit the pressures of the ground through three different ways: the proper support, through the sand acting as support and through the perimetrical pieces by means of connection support-union. The perimetrical pieces will work just as the one receiving the charge with the consequent minor transmission coefficient.

In this way there has been achieved a pavement capable of supporting the exact loads through the prefabricated piece, the deformations through the connection support-union and the recoveries through the injection of the sand.

BRIEF DESCRIPTION OF THE DRAWINGS

The invention will be further described by way of example with reference to the drawings, in which:

FIG. 3 is an enlarged section of one of the pieces to better observe the details of construction, as well as the bed of sand where it is supported and which occupies the inner recess.

FIG. 3 also partially illustrates other pieces in the same disposition to form a necessary wide pavement.

DETAILED DESCRIPTION OF THE PREFERRED EMBODIMENT

Figure 1A:
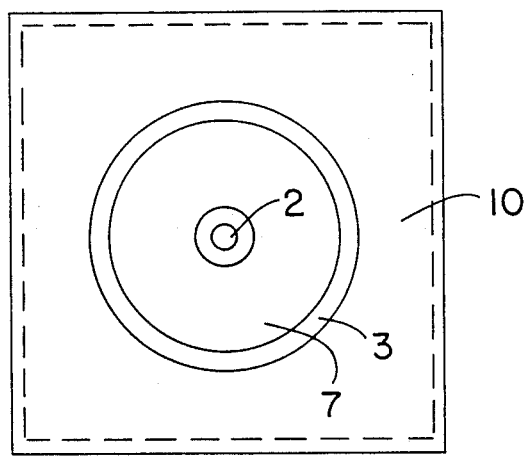
FIGS. 1a, 1b and 1c are an upper plan view, body plan, and lower plan view, respectively, of one of the pieces in plan view and quadrangular form.
Figure 1B:
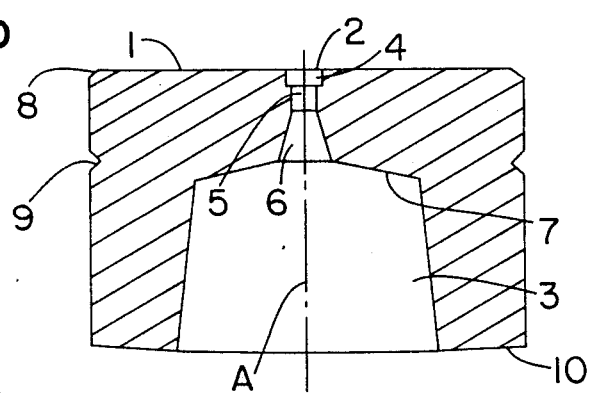
Figure 1C:
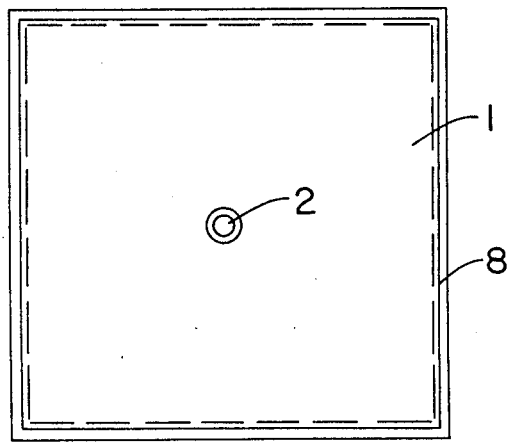
Figure 2A:
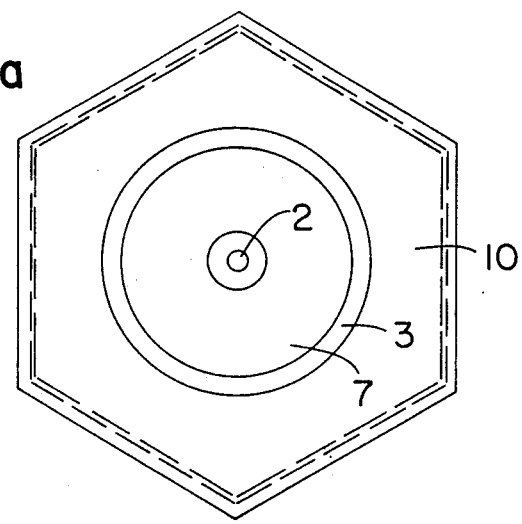
FIG. 2a, 2b and 2c are an upper plan view, body plan and lower plan view, respectively, of another piece in hexagonal form.
Figure 2B:
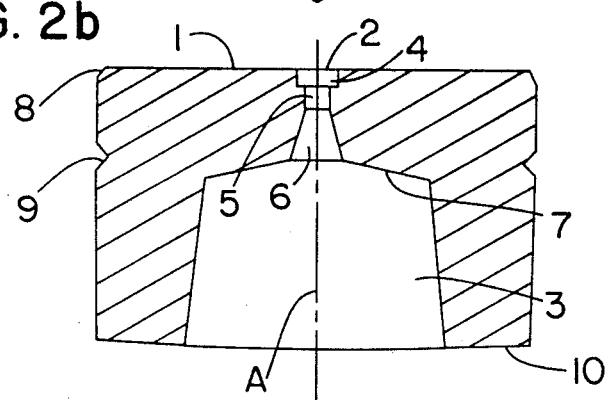
Figure 2C:
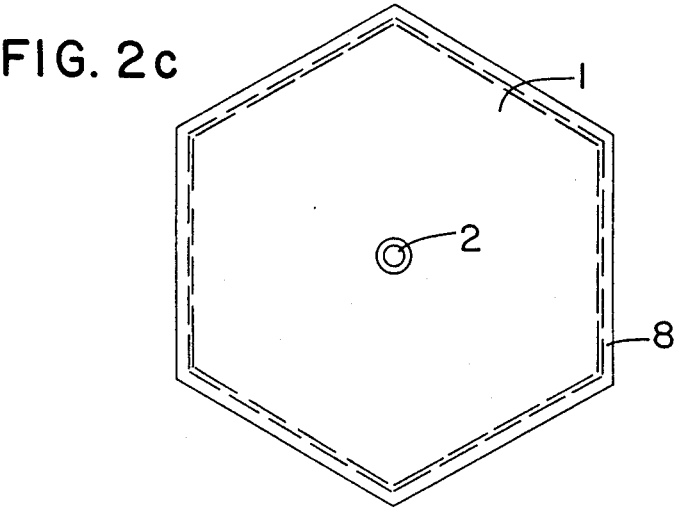

As to the embodiment of the drawings, the pieces, independent from its form in plan view, which can be one of the illustrated ones in FIGS. 1 or 2 or the like, as the rectangular plan, show a plane upper surface 1 having a perforation 2 in its geometric center axis A which connects said upper surface with an inner recess 3. The perforation comprises an upper sector 4 of a major diameter, a central sector 5 of minor diameter and a lower truncated conical sector or similar section 6. The lower recess has a truncated cone of truncated pyramidal shape or the like, as well as roofing 7.

Upper edges 8 are bevelled. Perimetrically there is a groove 9 acting as support for a joint 10 which constitutes the lateral union medium of some pieces with the other ones. The groove and the joint preferably affect the form as illustrated in the figures: angular groove and squared section joint. The base 10' is inclined towards the geometric center of the piece.

The outer walls of the pieces will have sufficient tolerance as observed in the drawings, specifically in FIG. 3 to facilitate elastic gyration between the pieces.

The recess of the pieces is filled up with sand 12 and all pieces are on the bed of sand 13 located on the surface to be paved 14.

Each one of the pieces is molded in masses of reinforced concrete or from any other suitable material or combination of suitable materials for the use for which they are destined in relation to the required services, i.e. in relation to the forces to be absorbed during use.

An elastic or metallic cap 11 is located in the upper zone of the perforation which can be disassembled when injection of sand takes place for the recovery of the pavement.

The semirigid floating pavement is constructed as follows:

Once the ground onto which the supporting pieces are disposed is extended, levelled and compacted, we proceed to the extension of approximately 5 cm of sand for settling of the supporting pieces which are assembled by means of the union-support joint to form the definitive pavement. After this operation of laying the pavement and before injecting the sand, a vibrating roller is passed over the surface to assure a perfect settling of the supporting pieces.

Then the sand is injected into the inside of the supporting pieces through its central perforation until observing that they have tendency to rise or that pressure on the sand reaches a determined value. The perforation is then covered with the cap.

After this operation, the definitive pavement is ready for use.

While there are no deformations on the ground, the situation remains constant as at the beginning, i.e., the applied loads will be transmitted to the ground through the supporting piece by means of its proper base and the base of the injected sand acting as enclosed space or compartment as explained before.

If the ground is deformed in a reduced surface the supporting pieces begin to transmit tensions to the union-support joints, so these last ones get deformed at the beginning to a minimum until the supporting piece finds its natural support.

Once operation of the precise load is finished the supporting piece recovers its original position, leaving a groove in the base which is filled by gravity by means of the sand contained in the lower recess. From that moment on the enclosed space doesn't act anymore although the tensions on the ground will be practically equal compensated with the distribution of loads to the perimetrically supporting pieces through the corresponding joints.

As can be observed, the base of the supporting piece has a proclivity to facilitate the entrance of the sand when the piece recovers its initial position, so that through its base the one brings to the other the sand contained in the inner recess through multiple passage cycles of loads thereby balancing the partial outlet of sand in each one.

When ground is deformed on wide surfaces, besides the specified phenomenon there will be produced a convexity on the pavement surface and that's why there has been disposed an inclination in the pavement to facilitate the gyration of the pieces through the union-support joint as shaft of the same.

In some cases, reinjection of sand is performed when sand has become depleted in the inner recess or when coming to the limit of deformation of the pavement as a consequence of gyration of the supporting pieces through its connection with others. Once the ground is stable it is convenient to reinject sand to the pavement to attain this "enclosed space" or compartment and liberate the joints from a work in perpetuity.

In the case of wishing to get a cavity in the pavement or just elevating or correcting its grade line by means of a reinjection, the base shows an inclination to facilitate the gyration of the pieces in the reverse direction.

The ground onto which this type of pavement is to be placed should be draining to avoid water climbing on the surface when loads are acting and the possible loss of sand because of entrainment. To try to waterproof to a maximum the finished pavement, the union-support joint will be continuous along the perimeter of the supporting piece and the upper orifice gets closed at pressure with a rubber cap which head remains under the finished surface to avoid rupture.

Situations can arise in which the pavement could be disposed with the designed supporting pieces on consolidated or stable filled grounds where differentials of low magnitude are foreseen.

In such cases the union-support joint can be omitted, lateral sides of the pieces can be vertical, connecting to the same separation or top joints to assure in the assembly a minimum distance between the same of approximately 2 mm. This separation between the vertical sides of the different pieces is later filled with sand to assure a perfect coupling of the pavement.

Small differences of elevation between pieces could be corrected by reinjecting sand into the inside of the pieces which need this operation.

The geometric dimensions of the pieces and their shape as well as the height are to be defined in each case, as to the use the pavement in question is to be subjected.

We claim:

1. A semirigid floating pavement comprising at least two independent pieces in the form of paving blocks laterally placed back to back to form a surface of variable width, characterized in that each one of the pieces is formed by molded blocks of a resistant material, each of said pieces having a flat upper surface, a base and an inner recess which opens at said base and is connected with the upper surface through an orifice; said base being formed by one or more planes inclined toward a geometric axis of the piece, the back to back pieces having adjacent outer lateral walls which are inclined relative to each other so as to allow a certain movement between the pieces, wherein each one of the outer lateral walls is provided with a channel, said channel housing an elastic joint of union and support between the pieces.

2. A semirigid floating pavement according to claim 1 wherein the inner recess of the piece is in the shape of a truncated cone, truncated pyramidal shape or similar, the orifice which connects said recess with the upper surface including an upper part and a lower zone.

3. A semirigid floating pavement according to claims 1 or 2 characterized in that an upper part of the orifice connecting the lower recess with the upper surface, is closed up by means of a cap at a slightly lower level with respect to the upper surface of the piece.

4. A semirigid floating pavement according to claim 1 characterized in that the inner recess of each one of the pieces is filled with sand through the orifice, which sand occupies said recess by gravity and compensates the movements of displacement of the pieces of the pavement.

5. A semirigid floating pavement according to claim 1 characterized by using a bed of sand as a slump base for the pieces on the surface to be paved.

6. A semirigid floating pavement according to claim 5 wherein said bed of sand has a thickness of about 5 cm.

* * * * *